Sept. 22, 1959      L. D. STATHAM      2,905,916
ELECTRICAL MOTION SENSING DEVICE Filed Oct. 29, 1956      2 Sheets-Sheet 1

INVENTOR.
LOUIS D. STATHAM
BY Philip Subrow
ATTORNEY.

Sept. 22, 1959
L. D. STATHAM
2,905,916
ELECTRICAL MOTION SENSING DEVICE
Filed Oct. 29, 1956
2 Sheets-Sheet 2
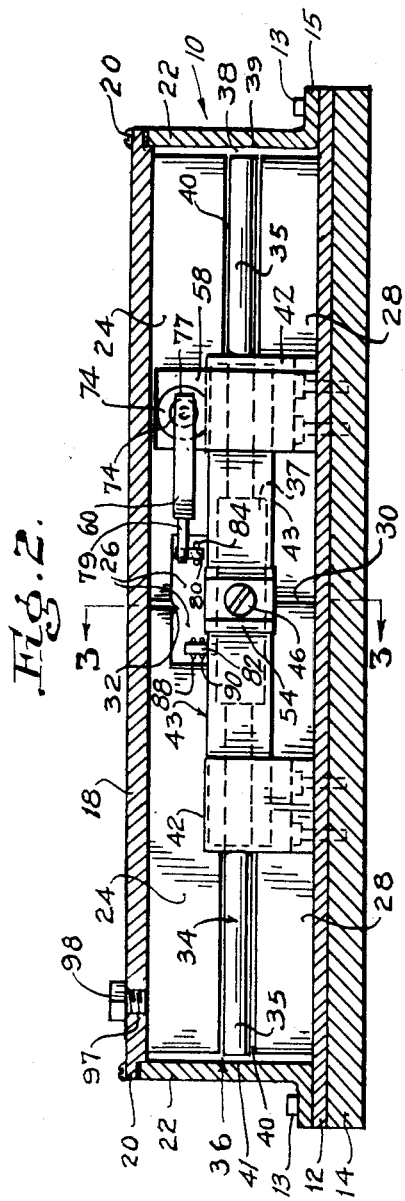
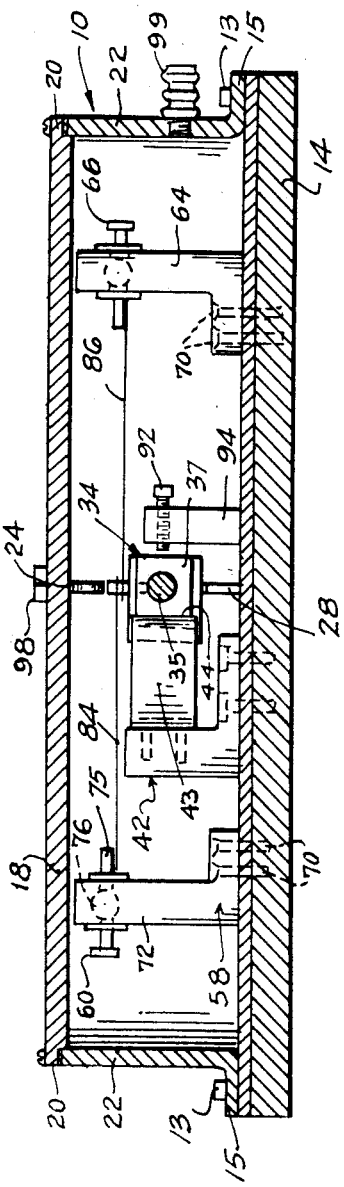
INVENTOR.
LOUIS D. STATHAM
BY Philip Subrow
ATTORNEY.

United States Patent Office 2,905,916
Patented Sept. 22, 1959

2,905,916

ELECTRICAL MOTION SENSING DEVICE

Louis D. Statham, Beverly Hills, Calif., assignor to Statham Instruments, Inc., Los Angeles, Calif., a corporation of California Application October 29, 1956, Serial No. 618,813

9 Claims. (Cl. 338—6)

This invention relates to a motion responsive device for indicating and recording the magnitude and nature of motions of an object in space. It particularly belongs to the general class of motion sensing devices known as accelerometers.

It is a characteristic of this invention that means are provided including a force summing means, i. e., a movable member, which may be a seismic mass, a rod, a diaphragm or the like, said member being connected to a frame, and a transducer connected to the frame and to said movable member, the motion of which is subject to a constraint provided by said transducer.

In the particular form of this invention as disclosed in this application the transducer is of the strain gauge type, and the force summing means or movable member is made sensitive to an angular acceleration and is moved angularly upon application of said angular acceleration.

In my co-pending application Serial No. 475,175, filed December 14, 1954, there is disclosed a device of this nature wherein a resilient connection is introduced between the transducer or strain wire, and the movable member.

One object of this invention is to provide a motion sensing device permitting a substantial displacement of the force summing means or movable member thereof, relative to the strain thereby produced in the strain wire of the transducer connected to said movable member for sensing the motion thereof.

It is another object of my invention to design an accelerometer in which an inertial mass or a member responsive to movement of said mass, is connected to an electrical strain wire transducer, and in which the displacement of the mass or said member may be made independent of and different from (preferably larger than) the variation in extension of the wire resulting from the displacement of the mass, so as to increase the range of the instrument.

I obtain these results by providing a motion sensing device comprising a frame, a motion sensing means in the form of a movable member mounted on said frame, an unbounded strain gauge transducer comprising an electrical resistance strain wire which is connected to said movable member, and means for resiliently connecting said strain wire to said frame, said resilient connecting means preferably having a stiffness less than the stiffness of said strain wire. The strain wire and said resilient connecting means together constrain motion of said movable member.

In the preferred embodiment of the invention, I employ as the resilient connecting means or flexible connection a spring, so that the strain wire is connected to the frame through said spring. By employing a spring which is substantially weaker than the strain wire, I increase the permissible displacement of the movable member for a given acceleration, thus increasing the range of the instrument. Also by increasing the permissible displacement of the force summing means or movable member, a lower natural frequency can be obtained than would be obtained by connecting the strain wires directly to the frame.

As in the device, for example, of my above co-pending application Serial No. 475,175, in a specific embodiment of the invention, I preferably employ a liquid mass and provide means sensitive to the displacement of the liquid mass relative to the container subjected to the motion to be sensed. For this purpose a movable member in the form of a paddle is mounted in the container so that the paddle may pivot. As a result of the relative motion of the liquid and container, a couple is thus created which causes the paddle to pivot on its axis and this motion may be sensed by my strain wire transducer which is connected to said paddle and to the aforementioned spring.

For a clear understanding of the instant invention, there is described below an illustrative embodiment of the invention, taken in connection with the accompanying drawings, wherein:

Fig. 2 is an irregular vertical section taken on line 2—2 of Fig. 1; and

Fig. 3 is an irregular vertical section taken on line 3—3 of Fig. 1.

Figure 1:
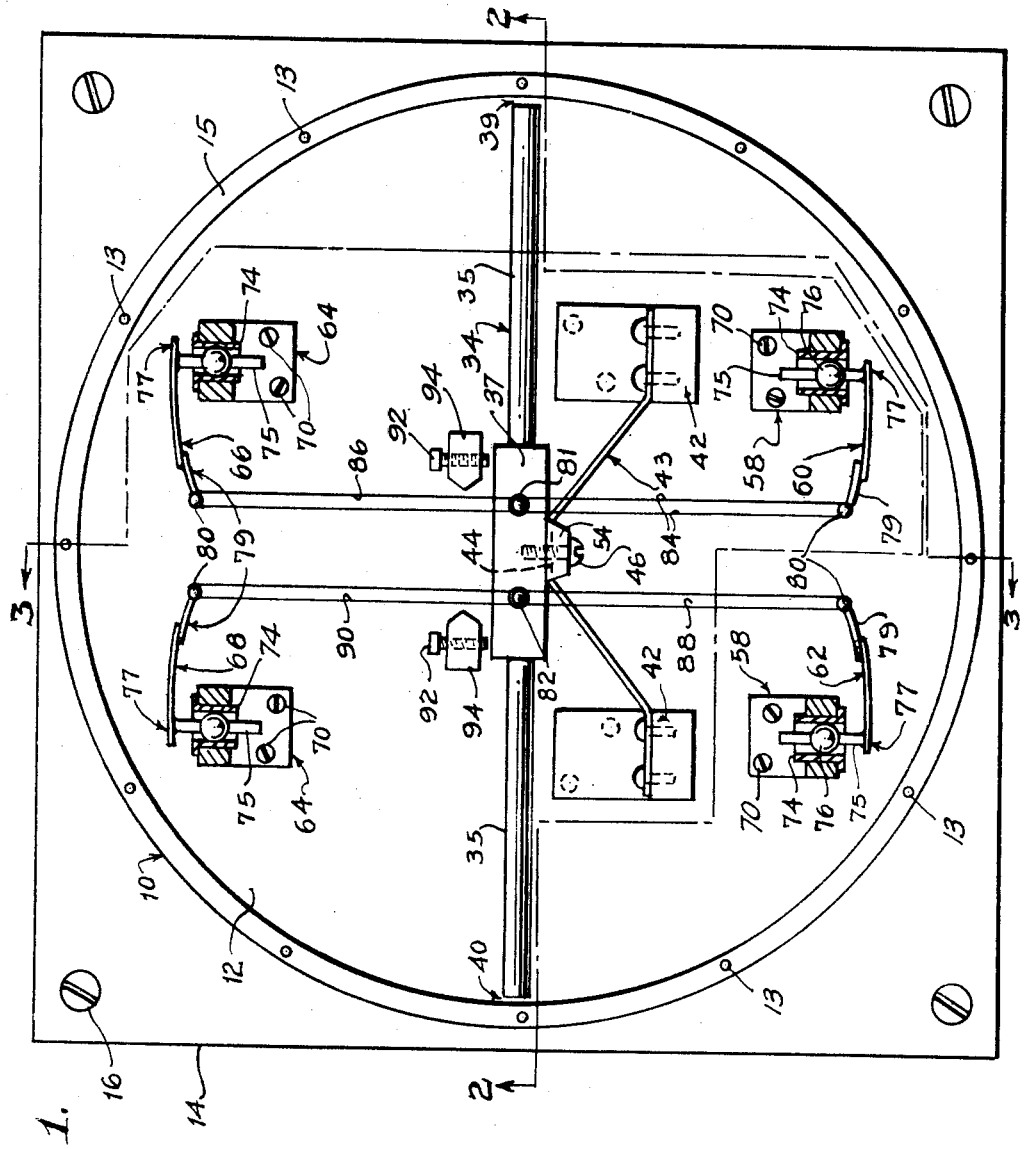
Fig. 1 is a plan view of the device with the cover and top baffles removed.

Referring to the drawings, numeral 10 is a container shown as a cylinder, but which may be of any shape provided it is a closed container and has opposing cylindrical wall surfaces at the paddle edges, as will be described below. The container is closed by a bottom 12 mounted on a base 14, members 10 and 12 being connected together by studs 13 passing through a flange 15 about the bottom of the cylinder 10, and into bottom 12. The bottom 12 of the container is connected to base 14 by screws 16. The top 18 is flanged at 20 about its outer edge to form a shoulder which fits snugly over the upper edge of the cylindrical wall 22 of the container.

Depending from the lower surface of the top 18 are a pair of upper vertical baffles 24 disposed diagonally across the container, the inner portions of the baffles being cut away at 26 to provide a space for the strain wire connections on the paddle, as described below. A second pair of lower vertical baffles 28 are connected to the bottom 12 of the container, and are positioned diagonally across the container directly below but spaced from the upper baffles 24. Each of the lower baffles and each of the upper baffles, extend inwardly from a point closely adjacent the inner surface of cylindrical wall 22, almost to the center of the container, leaving small spaces 30 and 32 between the adjacent inner ends of the respective lower and upper baffles.

A paddle 34 is placed in the longitudinal space 36 between the upper and lower baffles 24 and 28, and extends diametrically of the cylindrical container. The paddle is in the form of a pair of rod shaped end portions 35 each connected to a central block portion 37. However, the paddle may have other shapes than that specifically disclosed. The outer edges of the paddle are preferably spaced as at 38 from the adjacent wall sections 39 and 41 of the container to provide orifices through which the fluid can flow, so that on the passage of the liquid through the orifices as result of relative motion of the liquid and the container walls a damping effect results. An additional damping effect is obtained by reason of the parallel slots 40 formed between the paddle and the adjacent lower and upper edges, respectively, of baffles 24 and 28.

The paddle is mounted so as to pivot on the central axis of the container 10. The pivoted mounting is in the form of a V-shaped cardan spring 43 mounted on suitable brackets 42 connected to the bottom of the device. The base 44 of the spring is clamped between a member 54 and the center of the block portion 37 of paddle 34, by means of a fastener 46.

Mounted on a pair of L-shaped brackets 58 positioned on one side of the paddle adjacent brackets 42, are a pair of bowed springs 60 and 62, and also mounted on another pair of brackets 64 on the other side of the paddle directly opposite brackets 58, are a pair of bowed springs 66 and 68. The brackets 58 and 64 are all constructed alike, as are all of the bowed springs 60, 62, 66 and 68.

Each of brackets 58 and 64 is L-shaped, the lower end of each bracket being connected to the bottom 12 and base 14 by screws 70. The vertical portion 72 of each of brackets 58 and 64 carries an electrically insulating sleeve 74. One end of each of springs 60, 62, 66 and 68 carries a pin 75 on which is positioned an insulated ball 76 such as a glass ball, the pin and ball being disposed in the sleeve 74 with the ball in tight frictional engagement with the sleeve, to thereby hold the adjacent end 77 of each of said springs in fixed position. At the opposite end 79 of each of the spings is an insulating pin 80. End 79 of each of said springs is free to pivot about the fixed end 77 of each spring.

A pair of insulated pins 81 and 82 are mounted on the central block portion 37 of the paddle, said pins being spaced apart, pin 81 being approximately in alignment with the pins 80 on one pair of opposite springs 60 and 66, and pin 82 in approximate alignment with pins 80 on the other pair of opposing springs 62 and 68.

A strain wire 84 is looped in tension between pin 81 and pin 80 of spring 60 and a second strain wire 86 is looped in tension between pin 81 and pin 80 of spring 66. A third strain wire 88 is looped in tension between pin 82 and the pin 80 on spring 62, and a fourth strain wire 90 looped in tension between pin 82 and the pin 80 on spring 68. All of the wires are spaced on pins 82 and 81 to be out of electrical contact with each other. The ends of these wires are connected by leads (not shown) to terminals (not shown) for connection in a well known manner in a bridge circuit. The initial tension placed on each of the strain wires causes the free end 79 of each of the springs 60, 62, 66 and 68, to be bowed inwardly toward the paddle. Adjustable stop screws 92 are each mounted on a bracket 94 connected to the bottom 12 of the container 10. The stop screws can be set as desired to limit the angular motion of paddle 34.

The springs 60, 62, 66 and 68 preferably have a stiffness or spring constant which is smaller than the spring constant of the strain wires. Thus, paddle 34 is able to rotate through a substantially greater arc for a given acceleration and before the safe strain limit on the strain wires is reached, than where the strain wires are directly connected to the instrument frame.

The container 10 may be filled with liquid through a fill hole 97 in the top 18, stoppered by a screw 98, the fluid entering and filling the chamber within the container. A bellows 99 provides for expansion and contraction of the fluid due to temperature changes.

The liquid employed may be any liquid but, preferably, I select one having a high density and low viscosity or a high viscosity and low density to give the desired damping effect.

When the instrument is subjected to an angular acceleration such as to cause the paddle 34 to rotate clockwise as seen in Fig. 1, the strain on wires 86 and 88 and their respective springs 66 and 62 will increase while wires 84 and 90 and their respective springs 60 and 68 will be relaxed, and the resulting changes in resistance of the wires will be sensed by the bridge. During this period springs 66 and 62 will bend inwardly toward the paddle while springs 60 and 68 bend outwardly away from the paddle.

When the instrument is subjected to angular acceleration so as to cause the paddle 34 to rotate counterclockwise, the tension in wires 84 and 90 and their respective springs 60 and 68 will increase while wires 86 and 88 and springs 66 and 62 will be relaxed. In this case springs 60 and 68 bend inwardly toward the paddle, whereas springs 62 and 66 will bend back away from the paddle due to relaxation of wires 86 and 88.

From the foregoing, it will be seen that I have designed a motion sensing device preferably in the form of a liquid filled accelerometer employing a paddle and a strain wire transducer connected to the paddle, wherein I have substantially increased the displacement of the paddle for a given variation in tension on the strain wires to thus enhance the range of the instrument and decrease its frequency, by incorporating a simple weak spring system between the strain wires and the frame of the instrument.

This application is a continuation-in-part of application S.N. 430,226, filed May 17, 1954, now Patent No. 2,835,774.

While I have described a particular embodiment of my invention for the purpose of illustration, it should be understood that various modifications and adaptations thereof may be made within the spirit of the invention as set forth in the appended claims.

I claim:

1. An accelerometer comprising a case, a chamber in said case, a paddle in said chamber, a hinge for said paddle, said hinge being connected to said paddle and mounted in said chamber, a mounting for said hinge, said paddle being rotatably mounted in said chamber about said hinge, a wire mounting connected to said paddle, an electrical resistance strain wire connected to said wire mounting, a connection between said wire and said case, and a spring connected between said wire and said connection, said spring having a stiffness less than the stiffness of said wire.

2. An accelerometer comprising a case, a chamber in said case, said chamber having opposing cylindrical walls, liquid in said chamber, a paddle in said chamber, a hinge for said paddle, said hinge being connected to said paddle and mounted in said chamber, a mounting for said hinge, said paddle being rotatably mounted in said chamber about said hinge on the axis of said cylinder, said paddle extending from one wall to the opposing wall and immersed in said liquid, opposing edges of said paddle being adjacent the opposing cylindrical walls but spaced therefrom, a wire mounting connected to said paddle, an electrical resistance strain wire connected to said wire mounting, a connection between said wire and said case, and a spring connected between said wire and said connection, said spring having a stiffness substantially less than the stiffness of said wire.

3. An accelerometer comprising a case, a chamber in said case, a paddle in said chamber, a hinge for said paddle, said hinge being connected to said paddle and mounted in said chamber, a mounting for said hinge, said paddle being rotatably mounted in said chamber about said hinge, pins mounted on said paddle, brackets connected to said case, a plurality of springs each having a connection at one end to one of said brackets, said springs each pivoting at said connection, a pin connected to the opposite end of each of said springs, and electrical resistance strain wires looped in tension between the pins on said paddle and the pins on said springs, said springs being bowed under tension toward said paddle by said wires, said springs each having a stiffness less than the stiffness of its associated strain wire.

4. An accelerometer comprising a case, a chamber in said case, said chamber having opposing cylindrical walls, liquid in said chamber, a paddle in said chamber, a hinge for said paddle, said hinge being connected to said paddle and mounted in said chamber, a mounting for said hinge, said paddle being rotatably mounted in said chamber about said hinge on the axis of said cylinder, said paddle extending from one wall to the opposing wall and immersed in said liquid, opposing edges of said paddle being adjacent the opposing cylindrical walls but spaced therefrom, pins mounted on said paddle, brackets connected to said case, a plurality of springs each having a connection at one end to one of said brackets, said springs each pivoting at said connection, a pin connected to the opposite end of each of said springs, and electrical resistance strain wires looped in tension between the pins on said paddle and the pins on said springs, said springs being bowed under tension toward said paddle by said wires, said springs each having a stiffness substantially less than the stiffness of its associated strain wire.

5. An accelerometer comprising a case, a chamber in said case, a paddle in said chamber, a hinge for said paddle, said hinge being connected to said paddle and mounted in said chamber, a mounting for said hinge, said paddle being rotatably mounted in said chamber about said hinge, a wire mounting connected to said paddle, an electrical resistance strain wire connected to said wire mounting, and a spring connected between said wire and said case, said spring having a stiffness less than the stiffness of said wire.

6. A transducer comprising a force summing means, a strain wire, a resilient means, and a frame, said resilient means being connected to one end of said wire to form a wire and resilient means force sensing unit with said wire forming one end of said unit and said resilient means forming the other end of said unit, only one end of said unit being connected to said frame, and only the other end of said unit being connected to said force summing means, so that motion of said summing means is shared between said wire and said resilient means and the force applied to said wire by said summing means is transmitted to the frame through said unit only.

7. A transducer comprising a force summing means, a strain wire, a resilient means, and a frame connected in physical and operational series, said resilient means being interposed between one end of said wire and the case, and the other end of said wire being rigidly connected to said force summing means, whereby motion of said force summing means is shared between said resilient means and said wire and the force applied by the force summing means to the wire is transmitted to the frame only through said series wire and resilient means.

8. A transducer as set forth in claim 7, wherein said resilient means is a spring having a stiffness less than the stiffness of said strain wire.

9. A transducer as set forth in claim 8, wherein said force summing means comprises a rotatable member hingedly mounted on said frame for limited angular motion, said wire being connected to said rotatable member at a point spaced from its rotational axis, whereby angular motion of said rotatable member causes variations in tension of said wire.

References Cited in the file of this patent

UNITED STATES PATENTS

| 2,481,792 | Statham | Sept. 13, 1949 |
| 2,636,964 | Lancor et al. | Apr. 28, 1953 |
| 2,721,919 | Li et al. | Oct. 25, 1955 |